United States Patent Office 3,433,736
Patented Mar. 18, 1969

3,433,736
PROCESSES FOR ELIMINATING FROM A SOLUTION ANIONS DERIVED FROM HYDRACIDS AND OXACIDS
Jean-Louis Guth and Raymond Wey, Mulhouse, France, assignors to Commissariat à l'Energie Atomique, Paris, France
No Drawing. Continuation-in-part of applications Ser. No. 425,925, Jan. 15, 1965, and Ser. No. 426,420, Jan. 18, 1965. This application Apr. 8, 1968, Ser. No. 719,740
Claims priority, application France, Jan. 27, 1964, 961,689, 961,690, 961,691
U.S. Cl. 210—37     2 Claims
Int. Cl. C02b 1/58; C01b 33/28

ABSTRACT OF THE DISCLOSURE

Anions derived from hydracids and oxacids are removed from solutions by using hydroxysodalite as an ion exchanger and from oxacids using hydroxyparacancrinite as an ion exchanger at temperatures above 200° C. and at a saturated steam pressure at the temperature used.

CROSS-REFERENCE TO RELATED APPLICATIONS

This application is a continuation-in-part application to our copending applications Ser. Nos. 425,925 and 426,420 filed Jan. 15, 1965, and Jan. 18, 1965, respectively, and entitled, "Process for Eliminating From a Solution Anions Dervied From Hydracids," and "Process for Eliminating From a Solution Anions Derived From Oxacids," respectively, now both abandoned.

SUMMARY

Anions are removed from slightly alkaline solutions in which the OH⁻ ion concentration is about 0.1 N which anions are derived from hydracids and oxacids using hydroxysodalite and hydroxyparacancrinite, respectively, as ion exchangers at temperatures above 200° C. and at saturated steam pressure at the temperature used.

DESCRIPTION OF PREFERRED EMBODIMENTS

This invention is concerned with an anionic exchange process whereby anions derived from hydracids can be extracted from an alkaline aqueous solution at temperatures in the vicinity of or higher than 200° C. under the saturated steam pressure for the temperature used.

This invention is also concerned with an anionic exchange process whereby anions derived from oxacids can be extracted from a neutral or slightly alkaline aqueous solution at temperatures in the vicinity of or higher than 200° C. under the saturated steam pressure for the temperature used.

There exists a very large number of anion exchangers of organic origin which are capable of extracting from an aqueous solution anions which are derived from hydracids. However, such exchangers can only be employed within a limited temperature range and are subject to very rapid degradation at temperatures above 100° C. In the case of certain industrial applications, anion exchangers are required which must be capable of withstanding high temperatures which exceed, for example, 200° C. Among such applications can be mentioned by way of example the purification of the cooling fluid of a nuclear reactor when the coolant employed is steam. Furthermore, an anion exchanger of this type must satisfy the following conditions: it must offer resistance to radiation while at the same time ensuring good de-ionization of the liquid to be processed, it must only exchange OH⁻ ions and, finally, it must permit of easy passage of the liquid to be purified.

Consideration was given at a very early date to ion exchangers of the mineral type, namely, natural mineral compounds (of the montmorillonite type), synthetic mineral compounds (salts having very low solubility, phosphates and hydroxides of zirconium and thorium).

Montmorillonite is not an anion exchanger, but can become so by saturating this silico-aluminate with Ag⁺ cations, whereupon it exchanges the Cl⁻ anion for the corresponding cation according to the process:

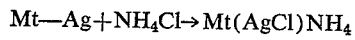

Mt—Ag+NH₄Cl→Mt(AgCl)NH₄ and its exchange capacity is approximately 0.6 meq. per gram of exchanger.

However, the use of montmorillonite which is saturated with cations as anion exchanger is limited to special cases and, moreover, loses its effectiveness as the temperature is higher.

Anion exchangers which also afford good resistance to high temperatures are thorium hydroxide and a mixture of zirconium hydroxide and zirconium phosphate. These exchangers are particularly suitable when the anions to be exchanged are present in a solution in a very low concentration. However, these exchangers have an extraction capacity which is considerably lower than that of organic exchangers.

A certain number of anion exchangers are already known, especially exchangers of anions derived from oxacids of organic origin, which prove fully satisfactory up to a temperature of 100° C. but which, above this temperature, undergo very rapid degradation and are consequently unfit for use. In the case of certain applications, especially in the nuclear industry, anion exchangers are required which are capable of withstanding high temperatures exceeding, for example, 200° C. and which are also radiation-resistant while at the same time ensuring good de-ionization of the liquid to be processed; this is the case, for example, in the purification of the cooling fluid of a nuclear reactor when this latter is of the steam-cooled type. In order that an anion exchanger can be employed for the purification of water, two further conditions must be satisfied: the anion exchanger must only exchange OH⁻ ions, and it must permit of easy passage of the liquid to be processed.

The present invention relates to anionic exchange processes whereby anions derived from hydroacids and oxacids can be extracted from an alkaline aqueous solution with a high yield and equal efficiency at temperatures in the vicinity of or higher than 200° C. under the saturated steam pressure for the temperature used.

The process in accordance with the invention is essentially characterized in that an aqueous solution which is either neutral or slightly alkaline and which contains anions derived from hydracids and oxacids is contacted with an anion exchanger consisting of a silico-aluminate such as hydroxysodalite or hydroxyparacancrinite, respectively, at a temperature in the vicinity of or higher than 200° C. under the saturated steam pressure for the temperature used.

One anion exchanger in accordance with the invention is a synthetic derivative of cubic structure and corresponding to the formula (Al₂O₃, 2SiO₂, Na₂O), 2NaOH, which exchanges in aqueous solution the OH⁻ ions for anions derived from hydracids such as the ions Cl⁻, Br⁻, I⁻ while at the same time retaining its structure.

According to the method of this invention, the exchange process takes place in a slightly alkaline medium, the concentration of OH⁻ ions being advantageously in the vicinity of 0.1 N at a temperature in the vicinity of or higher than 200° C. under the saturated steam pressure for the temperature used. Although the exchange process can also take place in a neutral medium, an alkaline medium is chosen in order to maintain good stability of the hydroxysodalite.

The process is carried into effect in an apparatus which is resistant both to alkaline corrosion and to pressure.

There now follows a description of one example of the process of this invention, said example being given without any limitation being implied. It will further be understood that this invention is not limited to the mode of operation which is described but includes within its scope all alternative forms which remain within the definition of equivalent chemical means.

EXAMPLE

The ion exchange process is carried out in closed copper tubes which are placed in an autoclave.

A series of tests has been carried out in an autoclave at 250° C. with very variable pH values and Cl⁻ ion concentrations.

Samples of 400 mg. of hydroxysodalite have been contacted with 6 cm.³ of solution containing Cl⁻ ions and OH⁻ ions.

The Cl⁻ ions were determined in the solution prior to and after the exchange process. Determinations of chloride were effected in the hydroxysodalite after completion of the exchange process. The results are recorded in the following table. These results show the selective fixation of the anions derived from hydracids by the hydroxysodalite.

Results of hydroxysodalite—Cl⁻ exchange processes:

| No. | Initial concentration of OH⁻ | Initial concentration of Cl⁻ | Meq. NaCl for 100 g. of exchanger (prior to exchange) | Final concentration of Cl⁻ | Meq. NaCl in 100 g. of exchanger (after exchange) | Percent Cl⁻ remaining in solution |
|---|---|---|---|---|---|---|
| 1 | 0 | 3.34 N/100 | 50 | 3.24 N/100 | 1.6 | 97 |
| 2 | 0 | 8.30 N/100 | 125 | 2.80 N/100 | 82 | 34 |
| 3 | 0 | 10 N/100 | 150 | 4.64 N/100 | 80 | 46 |
| 4 | 0 | 16.7 N/100 | 250 | 9.5 N/100 | 107 | 57 |
| 5 | 1.67 N/100 | 1.67 N/100 | 125 | 1.65 N/100 | 0.5 | 99 |
| 6 | 1.67 N/100 | 3.34 N/100 | 150 | 3.28 N/100 | 1 | 98 |
| 7 | 1.67 N/100 | 5.0 N/100 | 175 | 2.60 N/100 | 36 | 52 |
| 8 | 1.67 N/100 | 8.35 N/100 | 225 | 5.00 N/100 | 48.5 | 60 |
| 9 | 1.67 N/100 | 8.35 N/100 | 125 | 4.33 N/100 | 62.5 | 52 |
| 10 | 1.67 N/100 | 10.0 N/100 | 150 | 3.84 N/100 | 92.5 | 38 |
| 11 | 1.67 N/100 | 16.7 N/100 | 250 | 10.2 N/100 | 97.5 | 63 |
| 12 | 1.67 N/10 | 3.34 N/100 | 50 | 1.64 N/100 | 25.2 | 49 |
| 13 | 1.67 N/10 | 8.3 N/100 | 125 | 2.18 N/100 | 92 | 26 |
| 14 | 1.67 N/10 | 10 N/00 | 150 | 3.64 N/100 | 95.5 | 36 |
| 15 | 1.67 N/10 | 16.7 N/100 | 250 | 9.0 N/100 | 115 | 53 |

The hydroxysodalite employed for these tests was prepared in the following manner:

A mixture of one gram-molecule of amorphous silica, one gram-molecule of aluminum hydroxide, five gram-molecules of caustic soda and thirty-five gram-molecules of water is heated to approximately 325° C. in a copper-lined autoclave for a period of five days. After cooling, the mixture is filtered and the hydroxysodalite crystals are washed with distilled water and dried at 40° C. The crystals obtained are cubic and have dimensions within the range of 10 to 50 microns.

Hydroxyparacancrinite, which is a synthesized substance corresponding to the chemical formula 3(Al₂O₃, 2SiO₂, Na₂O) 2NaOH, exchange in aqueous solution the OH⁻ ions for ions derived from oxacids such as the SO₄²⁻ ion while at the same time retaining its structure. This exchange process takes place at a temperature in the vicinity of or higher than 200° C. in a neutral or basic medium and under the saturated steam pressure for the temperature used, while the concentration of OH⁻ ions is preferably below 0.1 N.

In a second example of the process, the starting solution employed contained sulphate ions, and the initial OH⁻ ion concentration in this solution was fixed at $$1.6 \frac{N}{100}$$

Tests were carried out in an autoclave at 250° C. by varying the concentration of sulphate ions at each test.

Samples of 500 mg. of hydroxyparacancrinite were contacted with 6 cm.³ of solution containing the SO₄²⁻ and OH⁻ ions. The concentration of SO₄²⁻ ions in the solution was determined both prior to and after the exchange process. The results are recorded in the following table which shows the fixation of SO₄²⁻ ions by the hydroxyparacancrinite.

TABLE

| OH⁻ concentration in the initial solution | Meq. Na₂SO₄ for 100 g. of exchanger (prior to exchange) | Na₂SO₄ concentration in the solution prior to exchange | Meq. Na₂SO₄ in 100 g. of exchanger (after exchange) | Na₂SO₄ concentration in the solution after exchange |
|---|---|---|---|---|
| 1.6 N/100 | 61.6 | 0.51 N/100 | 14.1 | 0.397 N/100 |
| 1.6 N/100 | 123.2 | 1.02 N/10 | 72.6 | 0.422 N/10 |
| 1.6 N/100 | 184.8 | 1.53 N/10 | 81 | 0.865 N/10 |
| 1.6 N/100 | 246.4 | 2.04 N/10 | 122.5 | 1.03 N/10 |

Hydroxyparacancrinite is prepared from a mixture of silica, aluminum hydroxide, soda and water, in which the atomic ratio of silicon to aluminum is higher than 1, the atomic ratio of sodium to aluminum is higher than 5, the molar ratio of water to soda is higher than 6, by heating this mixture to a temperature which is higher than 200° C., the pressure being the pressure of saturation at the temperature which is contemplated. A heating temperature which is higher than 200° C. makes it possible to attain equilibrium in a short time; this temperature will be advantageously within the range of 200° to 370° C. the pressure being always the pressure of saturation at the temperature which is contemplated.

A series of experiments were carried out by varying the molar ratios of the different compounds in the initial mixture as well as the heating temperature. The best results were obtained at a heating temperature in the range of 300 to 325° C. and when the molar ratios of the starting products were as follows: silica/aluminum hydroxide in the vicinity of 2, caustic soda/aluminum hydroxide between 6 and 7, water-caustic soda in the vicinity of 8.

When remaining within the operating limits which have been indicated, hydroxyparacancrinite is always obtained with excellent yields which can exceed 95% with respect to the weight of aluminum hydroxide initially introduced in the process. The product obtained appears in the form of hexagonal crystals.

The preparation is carried into practice, for example, in a non-corrodible, stainless steel autoclave provided with an internal lining of copper.

There will now be given below, solely, by way of illustration, two examples of preparation of hydroxyparacancrinite in accordance with the invention.

EXAMPLE 1

A mixture has been obtained using the following starting materials:

Amorphous hydrated silica,
Aluminum hydroxide in the form of bayerite,
Caustic soda in pellet form,
Distilled water;

this mixture had the following molar composition:

|  | Moles |
|---|---|
| Silica | 2 |
| Aluminum hydroxide | 1 |
| Caustic soda | 12 |
| Water | 200 |

The above mixture was placed in an autoclave which was heated for a period of ten days, the heating temperature being 250° C. After cooling of the autoclave, the hydroxyparacancrinite which was formed was filtered, then washed with distilled water. The product was then oven-dried at 40° C. and appeared in the form of elongated hexagonal crystals having a length of a few microns.

The yield with respect to the aluminum hydroxide initially introduced in the process was in the vicinity of 95%.

EXAMPLE 2

The same starting materials were employed and the mixture had the following molar composition:

|  | Moles |
|---|---|
| Silica | 2 |
| Aluminum hydroxide | 1 |
| Caustic soda | 8 |
| Water | 50 |

The above mixture was placed in an autoclave which was heated at 325° C. for a period of 5 days. After cooling, the hydroxyparacancrinite which was formed was separated by filtration and washed with distilled water. The silico-aluminate was dried in an oven at 40° C.

The hydroxyparacancrinite appeared in the form of elongated crystals having a length of approximately 50 microns.

The yield was of the order of 95% with respect to the weight of aluminum hydroxide initially introduced in the process.

We claim:

1. Anionic exchange process comprising the steps of extracting anion derived from hydracids from slightly alkaline aqueous solution at temperatures above 200° C. under saturated steam pressure at the temperature employed said aqueous solution having an OH$^-$ ion concentration of about 0.1N by passing said solution through an anion exchanger consisting of hydroxysodalite.

2. Anion exchange process comprising the step of extracting anions from oxacids in aqueous solution at temperatures above 200° C. in which the concentration of OH$^-$ ions is less than N/10 under saturated steam pressure at the temperature employed by contacting the solution with hydroxyparacancrinite.

References Cited

UNITED STATES PATENTS

| | | | |
|---|---|---|---|
| 2,911,285 | 11/1959 | Earley et al. | 23—110 |
| 3,128,247 | 4/1964 | Cohen et al. | 210—37 |

OTHER REFERENCES

"Some Research On Silicates: Mineral Syntheses and Metamorphoses," R.M. Barrier, Trans British Ceramic Soc., vol. 56, 1957, pages 162, 164, 166, 169.

SAMIH N. ZAHARNA, *Primary Examiner.*

U.S. Cl. X.R.
23—111